United States Patent [19]

Kazama et al.

[11] Patent Number: 5,103,351
[45] Date of Patent: Apr. 7, 1992

[54] MULTIPLE CORE MAGNETIC HEAD FOR MAGNETO-OPTICAL RECORDING APPARATUS

[75] Inventors: Toshio Kazama; Hiroe Takano; Akio Kishimoto, all of Nagaoka, Japan

[73] Assignee: Alps Electric Co., Ltd., Tokyo, Japan

[21] Appl. No.: 265,369

[22] Filed: Oct. 27, 1988

[30] Foreign Application Priority Data

Feb. 15, 1988 [JP] Japan .................................. 63-32398
Apr. 5, 1988 [JP] Japan .................................. 63-83768

[51] Int. Cl.⁵ .............................................. G11B 5/02
[52] U.S. Cl. ...................................... 360/59; 360/59; 360/110; 360/114
[58] Field of Search ..................... 360/110, 59, 114

[56] References Cited

U.S. PATENT DOCUMENTS 4,571,650  2/1986  Ojima et al. .
4,588,995  5/1986  Nishimura et al. ............... 360/59 X
4,618,901 10/1986  Hatakeyama et al. .......... 360/114 X
4,677,513  6/1987  Naito ............................. 360/114 X
4,686,661  8/1987  Isaka ............................... 360/59 X
4,707,755 11/1987  Ohta et al. ..................... 360/114 X
4,731,686  3/1988  Kato et al. ..................... 360/110 X
4,796,241  1/1989  Hayakawa et al. ............... 360/59 X Primary Examiner—Roy N. Envall, Jr.
Assistant Examiner—Hung H. Bui
Attorney, Agent, or Firm—Guy W. Shoup; Norman R. Klivans

[57] ABSTRACT

In a magneto-optical recording apparatus, a magnetic head is employed so as to perform vertical, or perpendicular magnetic recording. The magnetic head is constructed of a slider and a plurality of magnetic cores symmetrically positioned with respect to an axis of a magnetic recording medium. Each of the magnetic cores includes a main core, a return path core, and a gap.

4 Claims, 14 Drawing Sheets

MULTIPLE CORE MAGNETIC HEAD FOR MAGNETO-OPTICAL RECORDING APPARATUS

BACKGROUND OF THE INVENTION

1. Field of the Invention

The present invention generally relates to a magneto-optical recording apparatus. More particularly, the present invention is directed to the structure of a magnetic head portion of a magneto-optical recording apparatus.

2. Description of the Prior Art

As is well known in the art, the functions of a magneto-optical recording apparatus are to heat a portion of a magnetic recording medium by irradiating a laser beam onto the magnetic recording medium so as to reduce the coercive force of the irradiated medium portion, and to perform the recording operation under the above-described conditions. That is to say, the magneto-optical recording apparatus realizes perpendicular magnetic recording with a relatively small magnetic flux.

FIG. 25 schematically illustrates the prior art magneto-optical recording system. A magnetic recording medium 11 has a vertical (perpendicular) magnetizing film 13 on a light-transmitting substrate 12. A surface of the vertical magnetizing film 13 is covered with a protecting film 14. While a laser beam "L" focused by a light collecting lense 14 is projected onto the vertical magnetizing film 13, the film portion to which the laser beam is projected is subjected to a heat. A magnetic head 16 performs vertical (perpendicular) magnetic recording on the heated portion, of the vertical magnetizing film 13, and is constructed by winding a coil 18 around a bar-shaped magnetic core 17. The vertical magnetizing film 13 is vertically magnetized by flowing a recording current through the coil 18, so that the vertical, or perpendicular magnetic recording is carried out by the magnetic head 16.

In the conventional magneto-optical recording apparatus according to the above-described principle, theoretically, it is preferable that the strength of the recording field of the magnetic flux generated from the tip portion of the magnetic core 17 has its maximum value at the vertical magnetizing film 13. Since, however, the magnetic recording medium 11 is fabricated from, generally speaking, a soft material such as a synthetic resin, there is a limitation on the flatness of the magnetic recording medium. As a result, surface vibrations caused by rotation cannot be avoided. It is therefore required to introduce a predetermined spacing "S" between the magnetic recording medium 11 and magnetic head 16 so as to prevent the actual contact therebetween caused by these surface vibrations. Because, as previously stated, this spacing "S" is present and the edge of the magnetic core 17 has a flat shape as shown in FIG. 25, a large magnetic field is necessarily required to realize the vertical magnetization. In other words, the advantage of the magneto-optical recording apparatus where recording can be performed with a small magnetic field is substantially lost.

Taking account the above conventional art drawbacks, the Applicant has proposed in, for instance, Japanese patent application No. 62-30274 improvements in the tip shape of the magnetic head, whereby magnetic flux is concentrated onto the vertical magnetizing film 13 in order to increase the magnetic field efficiency. However, this solution has the following problem. That is, since the diameter of the core constituting the magnetic head cannot be made small, then the inductance of the magnetic circuit is large which is not suitable to produce a high frequency magnetic field.

Furthermore, the Applicant has proposed in Japanese patent application No. 62-223795 that a plurality of coils having cores of narrower diameters are employed for the magnetic head to concentrate the magnetic flux generated from the respective tip portions of these cores so that the inductance is small, and the strong magnetic field is applied to the magnetic recording medium.

Objects of the present invention are to improve the following with reference to the prior applications filed by the Applicant.

1) The structure of the magnetic head is simplified and readily machined.

2) The electromagnetic converting effect is increased.

3) A compact magnetic head is manufactured while maintaining magnetic recording efficiency.

SUMMARY OF THE INVENTION

To achieve the above-identified objects of the present invention, a magnetic head is provided for a magneto-optical recording apparatus wherein a laser light beam is irradiated onto a magnetic recording medium so as to heat same, and under this heating condition, magnetic recording is performed on the heated magnetic recording medium by employing the magnetic head, characterized in that the magnetic head is constructed of a slider positioned apart from a surface of the magnetic recording medium at a predetermined distance, and a plurality of magnetic cores which are supported by the slider and symmetrically positioned with respect to a vertical axis of the magnetic recording medium as a symmetrical center. The magnetic core is constructed of a main core around which a coil is wound and is oriented in a direction crossing the axial line; there is a return path core for forming a magnetic path which connects a tip portion of the main core and a base portion and a gap existing between the return path core and the tip portion of the main core.

The magnetic head for the magneto-optical recording apparatus as defined above is further characterized in that a sectional area of the tip portion of the above-described main core is smaller than sectional areas of other main core portions.

The magnetic head for the magneto-optical recording apparatus as defined above is further characterized in that a width of the main core's tip portion within a plane of the return path core is smaller than that of other portions of the main core.

According to the magnetic head of the invention, since a magnetic path has a return path connecting both end portions of a plurality of main cores, the magnetic flux density at the, tip portion of the main core increases, and also the magnetic core comprising the main core is symmetrically arranged in a vertical direction with respect to the magnetic recording medium, namely symmetrically positioned at an axial line, as a symmetrical center, parallel to the irradiation direction of the laser beam while magnetic recording, the synthetic magnetic field having a strength stronger than a predetermined field strength produced at a position separated at a given distance from the magnetic core.

Also, according to the magnetic head of the invention, the magnetic flux density of the tip portion of the magnetic head is increased so as to produce a large magnetic field at the surface of the magneto-optical disk.

BRIEF DESCRIPTION OF THE DRAWINGS

This invention and its advantages and features will be apparent from the ensuing description with reference to the accompanying drawings, wherein.

DETAILED DESCRIPTION OF THE INVENTION

FIGS. 1 through 11 illustrate a magnetic head for a magneto-optical recording apparatus according to a first preferred embodiment of the invention.

A basic construction of the magnetic head according to the first preferred embodiment is a slider 20 supported by a gimbal moved by a head drive mechanism so that a predetermined spacing is present between itself and a magnetic recording medium, and magnetic cores 21A to 21D are supported by the slider 20.

The slider 20 is constructed of a bottom plate portion 22 having a substantially rectangular shape and positioned opposite to the magnetic recording medium, and slider supporting portions 23 mounted on upper surfaces of bottom plate portion 22 at positions corresponding to summits of the bottom plate portion 22. Slits 24 are formed on the slider 20, which extends from a center of the bottom plate portion 22 toward each of the slider supporting portions 23, whereas the above-described magnetic cores 21A to 21D are inserted into the slits 24 to be held therein.

Figure 1:
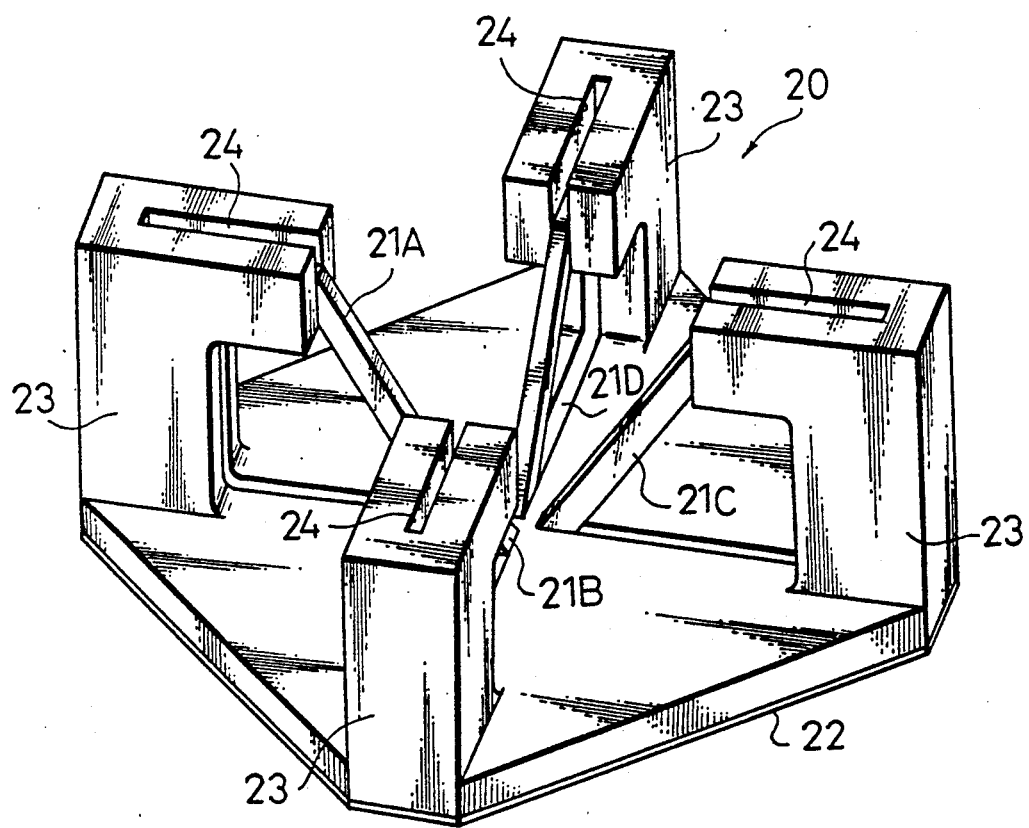
FIG. 1 is a perspective view of the entire magnetic head according to a first preferred embodiment of the invention.
Figure 2:
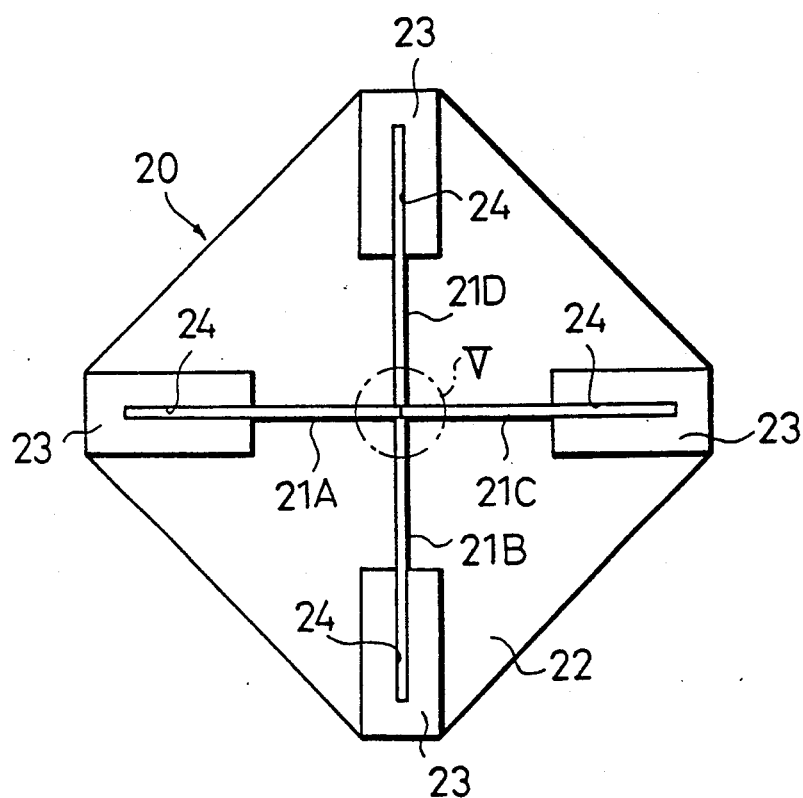
FIG. 2 is a plan view of the magnetic head shown in FIG. 1.
Figure 3:
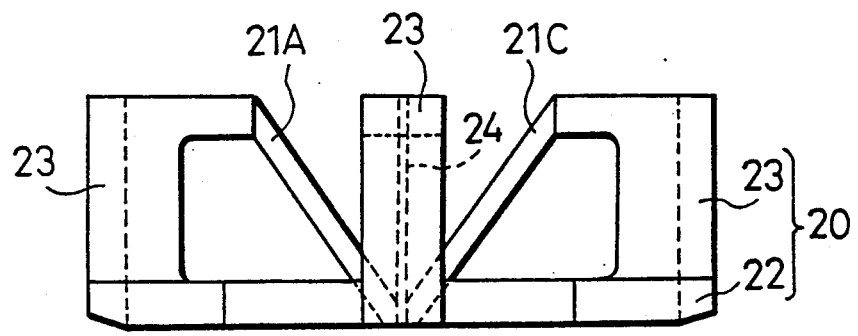
FIG. 3 is a front view of the magnetic head shown in FIG. 1.
Figure 4:
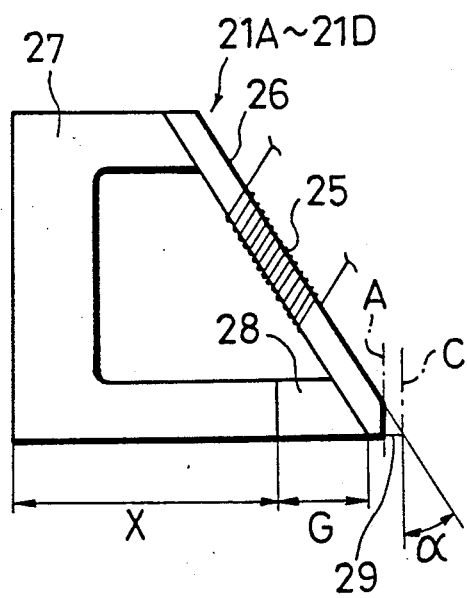
FIG. 4 is a plan view of the magnetic core according to the preferred embodiment of the Invention.

As illustrated in FIG. 4, the magnetic cores 21A to 21D are thin film members each having a flat shape. This magnetic core 21A, 21D is constructed of a flat main core 26 around which a coil 25 is wound, a C-shaped return path core 27 for forming a magnetic path which connects both ends of the main core 26, and a gap member 28 existing between one end of the return path core 27 and a bottom end of the main core 26 (i.e., the end of the main core 26 projecting toward the magnetic recording medium).

Main core 26 and return path core 27 are made of a ferromagnetic material such as Mn-Zn ferrite, whereas the gap member 28 is formed of a non-magnetic material such as $CaTiO_3$. The magnetic core can be readily manufactured by employing common technology so that, for instance, an I-bar (or a flat bar) having the same cross-sectional view as the flat shape (illustrated in FIG. 4) of the main core 26, a C-bar having the same cross-sectional view as the flat shape of the return path core 27, and an I-bar (or a flat bar) having the same sectional view as the flat shape of the gap member 28 are attached to each other and formed in one body, and thereafter sliced to a predetermined thickness.

Figure 5:
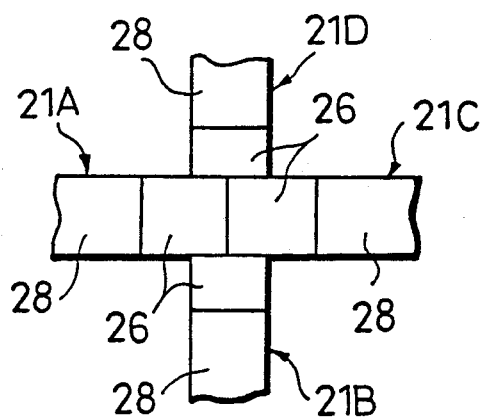
FIG. 5 is an enlarged lower surface view of the magnetic head portion indicated by a dashed line V of FIG. 2.

In the above-described preferred embodiment, the respective magnetic magnetic cores 21A to 21D are symmetrically positioned in such a manner that they are normal to the bottom surface (i.e., the plane parallel to the magnetic recording medium) of the slider, and also a pair of these cores are contained within two planes which are perpendicular to each other. The tip portions of these magnetic cores 21A to 21D are positioned, as illustrated in FIG. 5, in such a way that the tip portions of paired magnetic cores 21A and 21C are in contact with each other, and also the tip portions of the other paired magnetic cores 21B and 21D sandwich the projected portions of the magnetic cores 21A and 21C. Then, the tip portions 29 of the magnetic cores 21A and 21C are formed at the position represented by the dotted line of FIG. 4, whereas the tip portions of the magnetic cores 21B and 21D are cut off, and these cut tip portions project as shown by chain line A of FIG. 4. Accordingly, the sizes corresponding to the thicknesses of the magnetic cores 21A and 21C at the projected portions are corrected.

In addition, the main core 26 of the respective magnetic cores 21A to 21D is positioned at an angle "α" of 35° to a vertical line "C" with respect to the magnetic recording medium. Then, if such an angle is selected, a size "G" of the gap is about 1.8 mm by which the maximum strength magnetic field is established within the magnetic recording metium immediately under the projected positions of the magnetic cores 21A to 21D.

The magnetic cores 21A to 21D having the above-described structures can be easily assembled by inserting the magnetic cores 21A to 21D into the above-mentioned slider 24. The coils wound on the respective magnetic coils 21A to 21D are connected in parallel to a power source, so that low inductance can be maintained with a better high frequency characteristic, and sufficient magnetomotive force can be produced, and furthermore, sufficient strength of the magnetic field can be effected at a predetermined portion of the magnetic recording medium.

Figure 6:
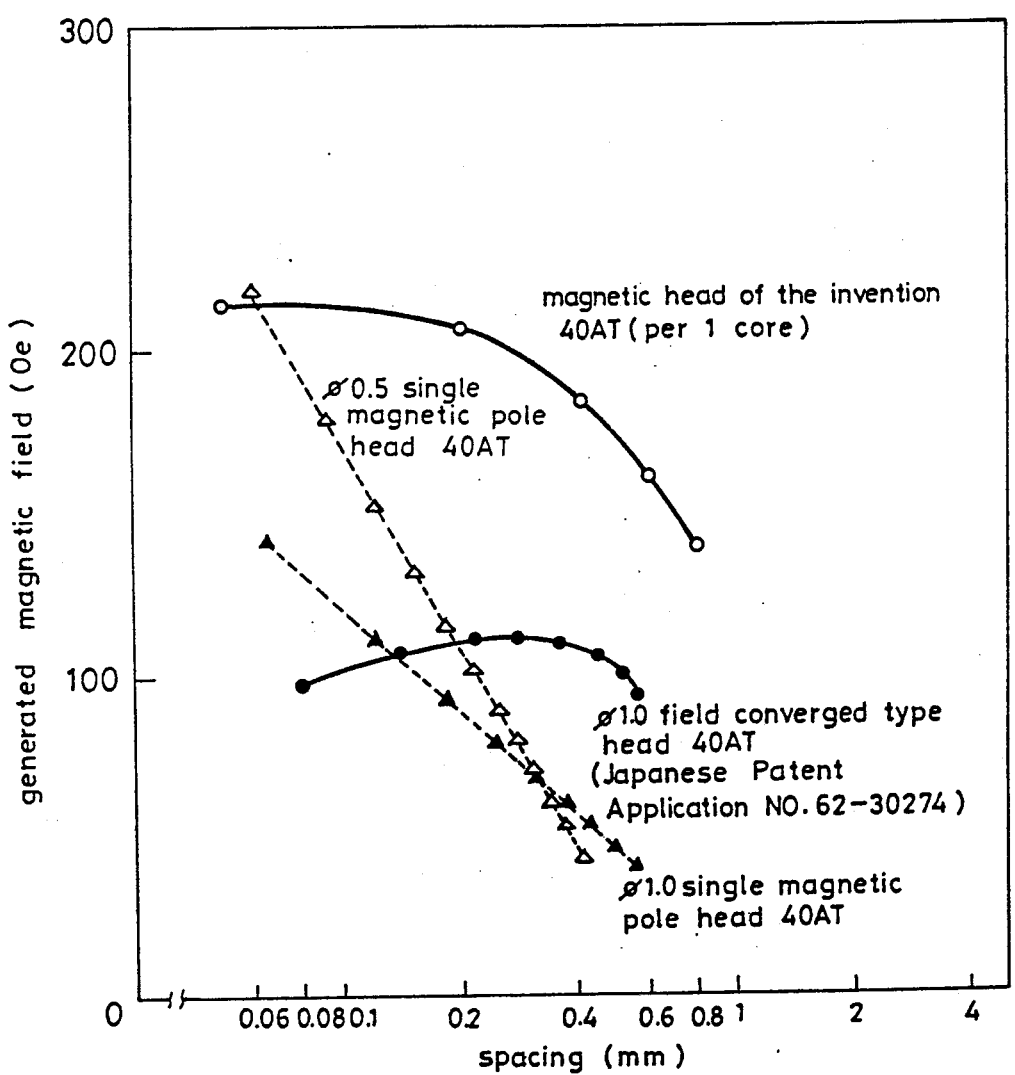
FIG. 6 is an illustration of the relationships between spacing and generated magnetic field of the magnetic core according to the conventional art and the present invention.
Figure 7:
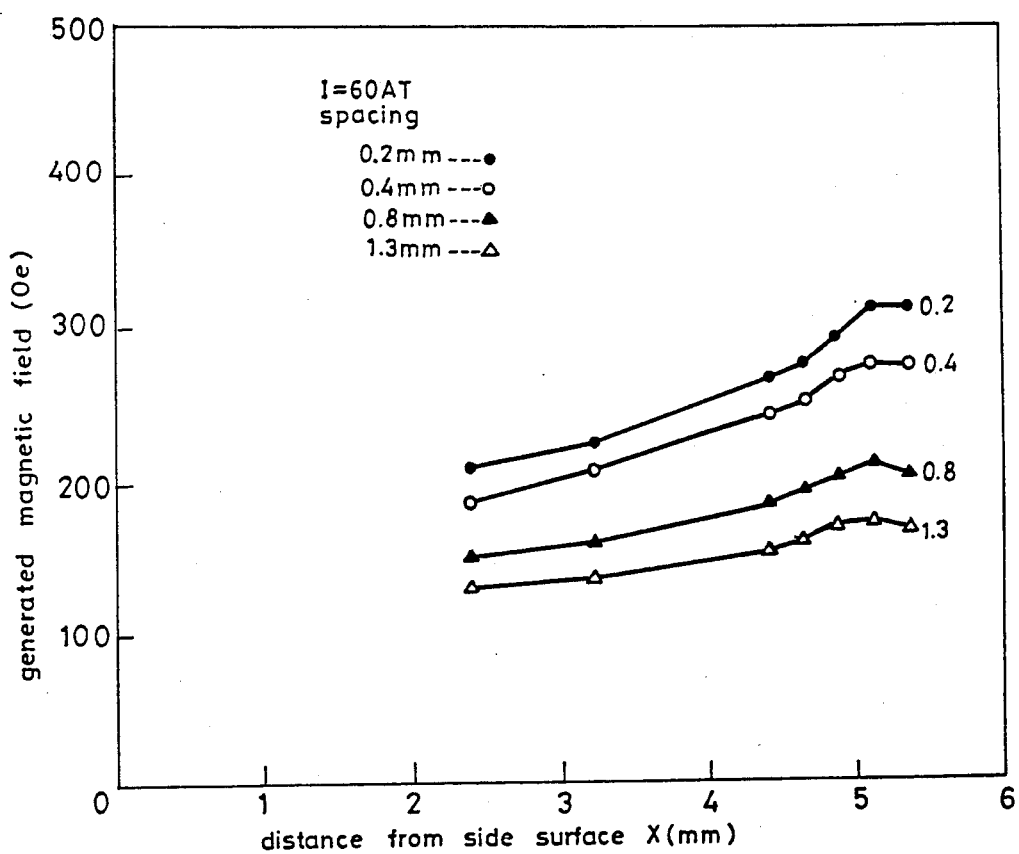
FIG. 7 is an illustration of the relationships with respect to spacing between the generated magnetic field and the distance from the side surface of the magnetic core to the gap.

When the performance of the magnetic head having a construction similar to that of the first preferred embodiment (where only one pair of magnetic cores 21A and 21C are employed, for instance) is compared with that of the conventional magnetic head, the comparison results are as illustrated in FIG. 6.

Precisely speaking, the conventional magnetic cores of Mn-Zn ferrite having rod shapes of diameters thereof: 1.0 mm and 0.5 mm were effected by the magnetomotive force of 40 AT (Ampere-Turns), whereas the magnetic core of Mn-Zn ferrite having a rod shape of a diameter thereof: approximately 1.0 mm whose tip shape is concave was effected by the magnetomotive force of 40 AT in the preferred embodiment of the above-described Japanese patent application No. 62-30274. The field strength measurement was performed on spacings in the case that the magnetomotive force of 40 AT given to each of the magnetic cores (plate-like cores having the thickness of 0.2 mm and width of 0.5 mm) having the return path as illustrated in FIG. 4.

As a result of this measurement, the magnetic field generated by the magnetic head according to the preferred embodiment has a small variation with respect to variations in the spacings, as compared with the conventional magnetic head. In other words, it is recognized that the generated field scarcely depends on the spacings. Since, as previously described, the variations in the magnetic field outputs due to the surface vibrations of the magnetic recording medium can be reduced, it has been recognized that a uniform magnetic field can be generated over the broad range. This can be understood from the measurement results of the magnetic field variations above the magnetic recording medium under the condition that the spacing is selected to be 0.2±0.1 mm. That is, field variations from ±38% to −21% occur in the conventional magnetic head having a diameter of, for instance, 1.0 mm, whereas those from +4% to −5% occur in the magnetic head according to the preferred embodiment.

Also, it is recognized that comparing the strengths of the generated magnetic fields for the magnetic heads whose spacings are 0.2 mm, the field strength of the magnetic head according to the preferred embodiment is approximately twice that of the conventional magnetic head.

When an experiment was done to obtain an optimum length of the return path(indicated by "X" in FIG. 4) of the magnetic head having the same construction, the maximum field strengths were measured for spacings of 0.2; 0.4; 0.8; and 1.3 mm when the magnetomotive force was 60 AT and the length "X" was 5.1 mm.

Figure 8:
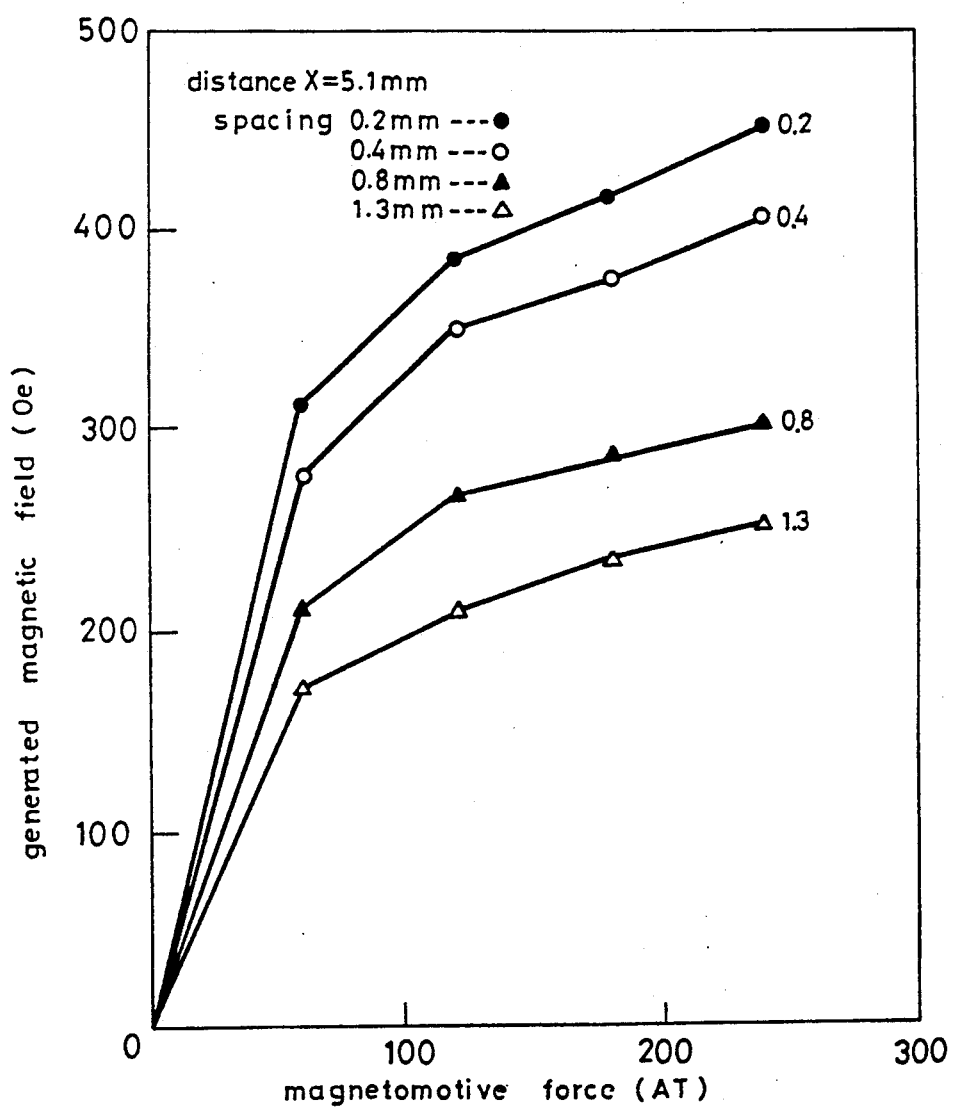
FIG. 8 is an illustration of the relationships with regard to spacing between the magneto-motive force and the generated magnetic field.

When the magnetomotive force capable of generating the magnetic field having the strength of 200 Oe (oersteds), which is required for performing the magneto-optical recording, was measured, the results are in FIG. 8. That is, in FIG. 2, when a pair of magnetic cores such as 21A and 21C 21B and 21D were employed, a magnetic field strength of more than 200 Oe was generated when the magnetomotive force was 50 AT and the spacing was less than 0.4 mm.

Figure 9:
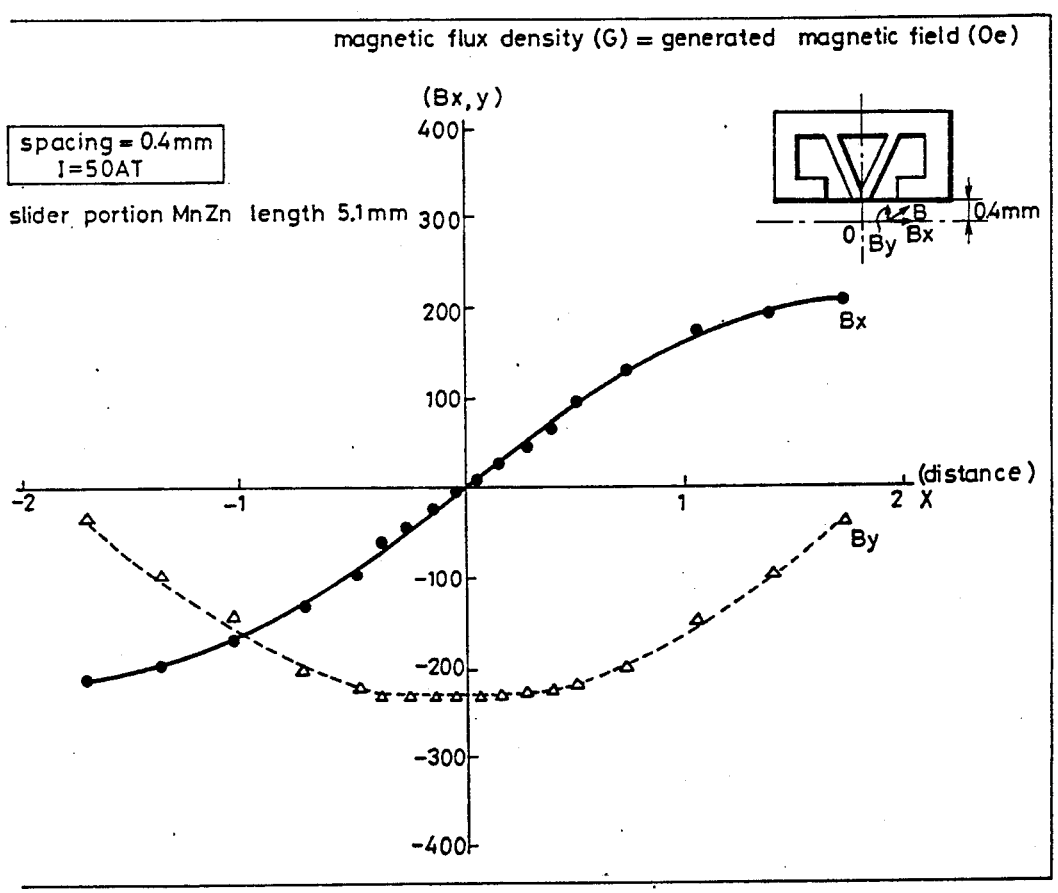
FIG. 9 is an illustration indicating the magnetic flux density at various positions ajacent to the magnetic core.

In addition, the magnetic flux density was measured and represented in FIG. 9 under the following conditions. When the spacing was selected to be 0.4 mm, and the magneto-motive force was set to 50 AT, the flux density "G" (gauss, being proportional to the strength of the generated magnetic field) was measured at points apart from an intersecting point between a center line of the magnetic head and the upper surface of the magnetic recording medium in both the X-axis and Y-axis directions.

That is, the vertical magnetic field "By" having flux density of 230 G to the magnetization could be stably measured over the range such that the distance from the intersecting point "0" to the X-axis was±0.5 mm. Also, it was recognized that the horizontal magnetic field "BX" was sufficiently lower than the vertical magnetic field "By" within this range.

It should be noted that the above-described measurements were performed by employing paired (i.e., two) magnetic cores, and since twice the magnetic field strength may be generated in total when a magnetic head having four magnetic cores is employed as illustrated in FIGS. 1 to 4, a predetermined field strength may be produced by providing a magnetomotive force of 25 AT to each core.

Figure 10:
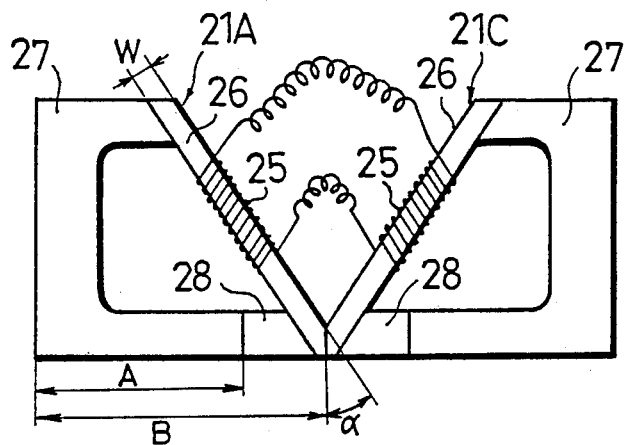
FIG. 10 is an illustration indicating various dimensions of the magnetic core adapted to the experiment for measuring the strength of the magnetic field in the various spacings.
Figure 11:
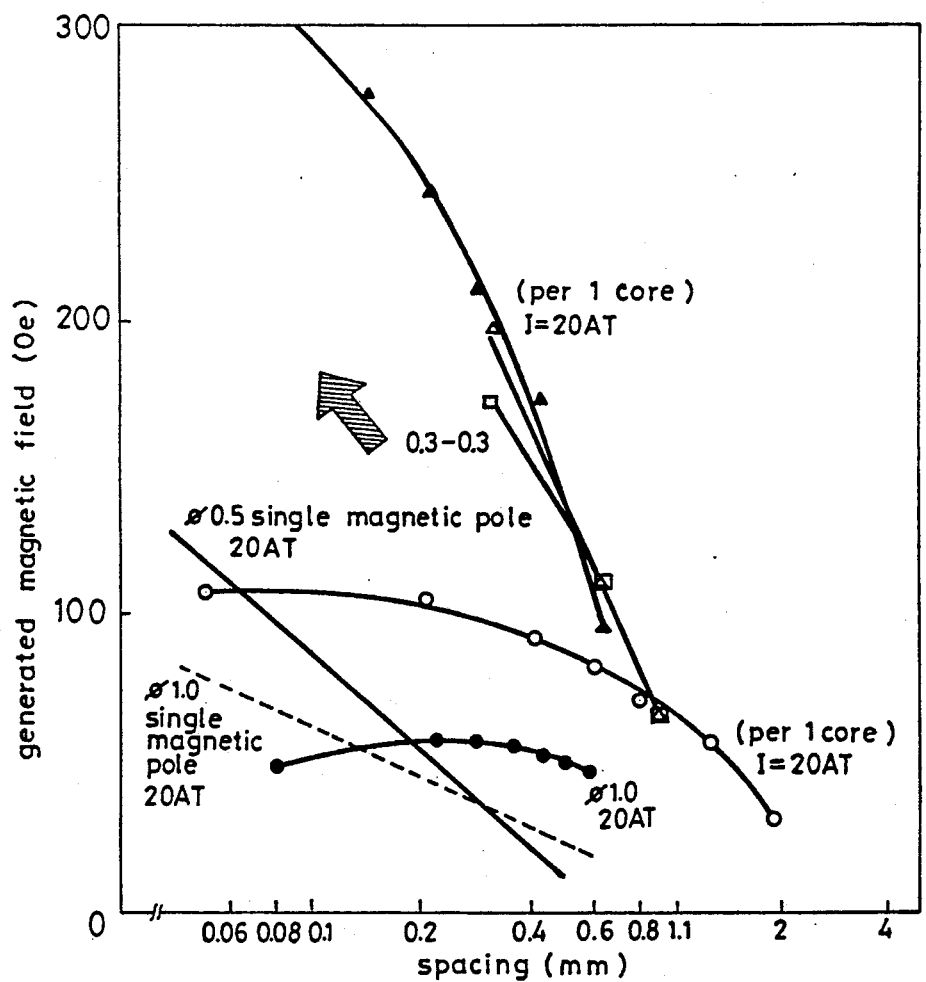
FIG. 11 is an illustration of the relationships with respect to the respective main cores having various dimensions, between the spacing of the main core and the strength of the magnetic field.

Furthermore, results of experiments to obtain the optimum values of the widths of the above-described magnetic cores 21A to 21D (indicated by "W" in FIG. 4) are in FIGS. 10 and 11. When, as shown in FIG. 10, a pair of magnetic cores 21A and 21C were positioned opposite to each other, the variations in the generated fields versus the variations in the spacings were measured and represented in FIG. 11 under the condition that a magnetomotive force I of 20 AT was given to each core.

Experiment No. 1 (Plotted by Symbol "0")

When the magnetic head had the structure shown in FIG. 10, the following parameters were set: A=7.5 mm; B=4.7 mm; Wo=0.5 mm; α=35°, and thickness "t" =0.2 mm.

Experiment No. 2 (Plotted by Symbol "□")

When the magnetic head had the structure shown in FIG. 10, the following parameters were set: A=2.5 mm; B=2.0 mm; Wo=0.3 mm; α=35°, and thickness "t"=1.4 mm.

Comparison No. 1 (Plotted by Symbol "•")

A concave shape was formed on the tip portion of the rod-shaped core having a diameter of 1.0 mm, as described in Japanese patent application No. 60-30274, so that the magnetic flux generated by this magnetic core was concentrated at the surface of the magneto-optical recording disk.

Comparison No. 2 (Plotted by a Dot Line)

The rod-shaped magnetic core was employed with a flat tip portion and a diameter of 1.0 mm.

Comparison No. 3 (Plotted by a Straigth Line)

The rod-shaped magnetic core was employed with a flat tip portion and a diameter of 1.0 mm.

That is to say, it is recognized that as plotted by the symbol "○", a greater magnetic field than that of the conventional magnetic core was generated (see comparison results No. 1 to 3) by the magnetic core employed in the Experiment No. 1 in the range where the spacing was more than 0.06 mm, and also an extremely large magnetic field was produced by the spacings from 0.2 to 0.6 mm experimentally employed, as compared with that of the conventional magnetic core.

According to the magnetic core employed in the above-described Experiment No. 2, since the width "W" of the main core 26 was narrower (approximately 60%) than that of the main core employed in the Experiment No. 1, and the magnetic flux density was increased, a magnetic field strength two times stronger than that of the conventional core, and a field strength which was approximately 1.3 times stronger than that of the conventional core were generated in the spacing of 0.3 mm.

Moreover, when a calculation was carried out on the relationship between the magnetic field length and spacings of the magnetic core (similar to the magnetic core employed in the Experiment No. 2) which was fabricated by reducing the size of the magnetic core employed in the Experiment No. 1 by ⅓ reduction, the characteristics plotted by the symbol "▲" shown in FIG. 11 were obtained. It is therefore recognized that this theoretical data is very close to the characteristic obtained in Experiment No. 2.

Figure 12:
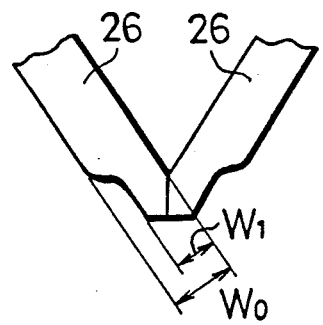
FIG. 12 is a plan view of a tip portion of a main core according to a second preferred embodiment of the invention.

It should be noted that the characteristic curve plotted by the symbol "▲" shown in FIG. 11 is that of a magnetic core according to a second preferred embodiment as illustrated in FIG. 12.

According to the second preferred embodiment of the invention, with respect to the magnetic head employed in Experiment No. 2 shown in FIG. 10, the width "$W_1$" of the tip portion of the main core 26 is narrower than the width "Wo" of other core portions. As a result of such a core structure, the magnetic flux density adjacent to the tip portion of the main core 26 can be increased.

It is recognized that when employing the main core 26A according to the second preferred embodiment, the magnetic field strength thereof under the spacings 0.3 to 0.6 can be increased a maximum of 20%, as plotted by the symbol "▲" shown in FIG. 11.

Figure 13:
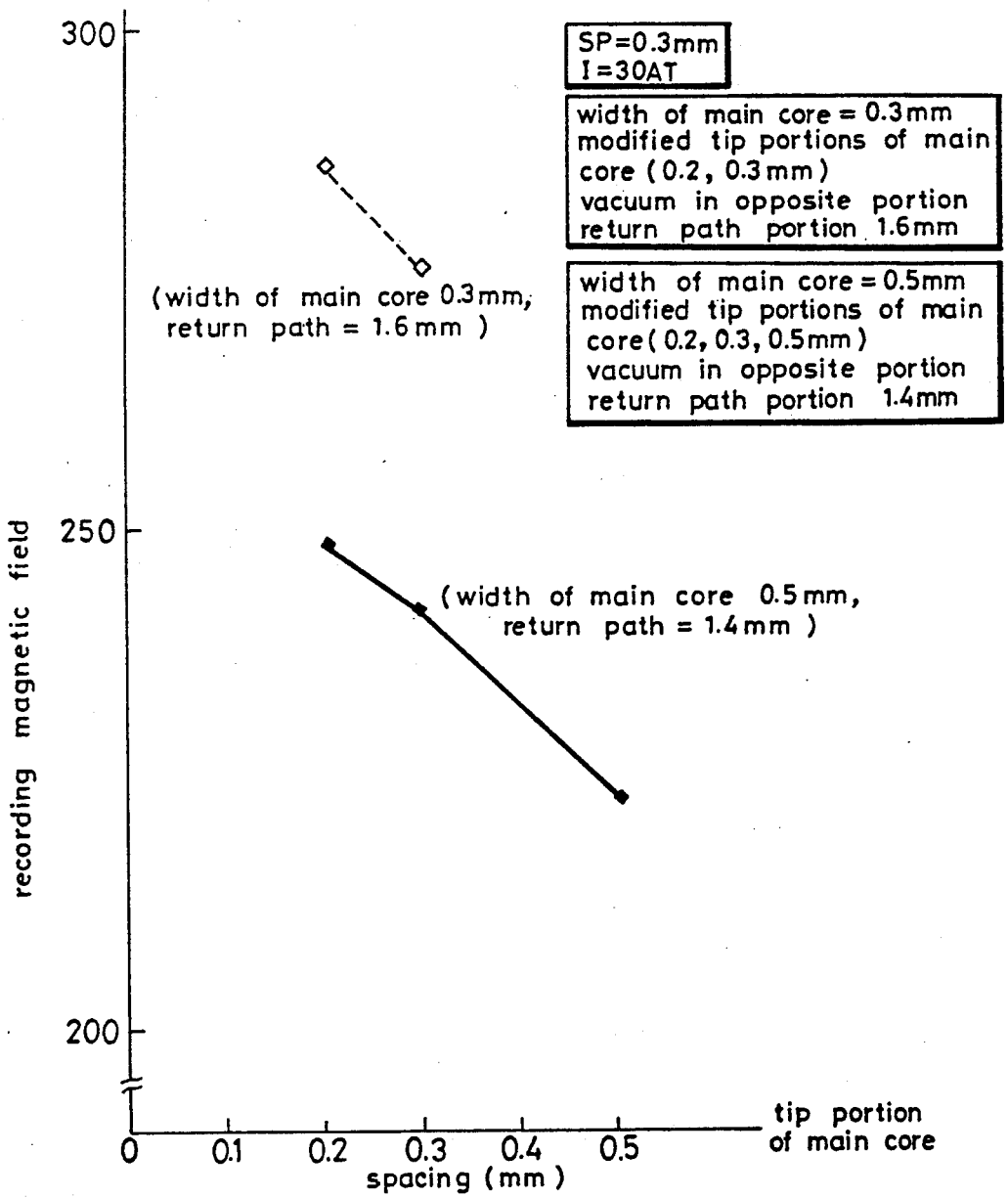
FIG. 13 is an illustration representing variations in the strength of the magnetic field in the case of a narrow width of the tip portion of the main core shown in FIG. 12.
Figure 14:
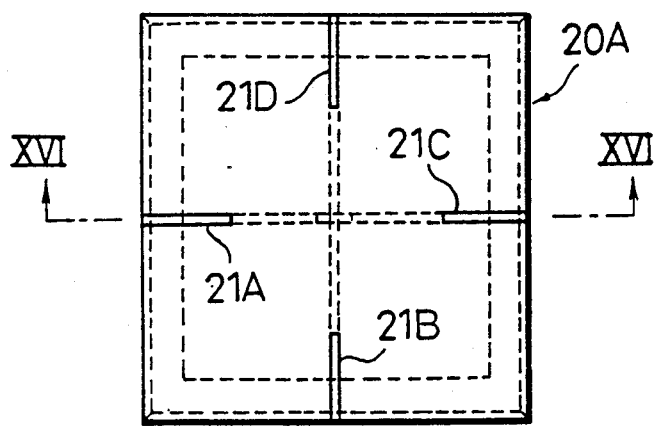
FIG. 14 is a plan view of a magnetic head according to a third preferred embodiment of the invention.

Results of the experiment to obtain the optimum value of the width "$W_1$" of the magnetic core 26A according to the second preferred embodiment were represented in FIG. 13.

That is, when the conditions of the magnetic core were: Wo=0.3 mm; A=1.6 mm; t=0.2 mm (plotted by the symbol "◆" shown in FIG. 13), and Wo=0.5 mm; A=1.4 mm; t=0.2 mm (plotted by the symbol "◇" shown in FIG. 13), the magneto-motive force was set to 30 AT, and the width "$W_1$" of the tip portion of the magnetic core was successively varied, the magnetic field strengths at the point of the spacing of 0.3 mm were measured and the resultant measurement data are illustrated in FIG. 13.

As is apparent from this graphic representation, the width "$W_1$" of the main core 26A is narrow, so that the magnetic flux density at the tip portion of the main core 26 can be increased, and thus a main core having a narrow tip portion can provide a higher field strength than that of the main core having a constant width.

It is understood that although the widths "$W_1$" of the main core 26A according to the first and second preferred embodiments, namely the sizes of the main cores 26, 26A located in a two-dimensional plane involving the magnetic path which is formed by the return path core 27 were small, the magnetic flux density may be increased to some extent, even if the thickness "t" of the entire main core, or tip portion thereof is made thin.

FIGS. 14 to 18 illustrate a magnetic head according to a third preferred embodiment of the invention, employing the magnetic core of the above-described first or second preferred embodiment.

In the magnetic head, a slit 24 similar to the above first preferred embodiment is formed on a box-shaped slider 20A. Magnetic cores 21A to 21D having similar arrangements to the cores shown in FIG. 4 are inserted into this slit 24 and held therein.

The slider 20A is made of non-magnetic material such as $CaTiO_3$ which has been adapted to the gap according to the first preferred embodiment. This slit 24 is cut out in the direction from the outer peripheral part of the slider 20A to the inside. The slit 24 has a portion (indicated by numeral 24a of FIG. 14) having a shape corresponding to the shape of the return path for the magnetic core 21A to 21D, and also portions (represented by numerals 24b, 24c of FIG. 18) which are in contact with edge portions of both ends of the main core 26. In addition, the portion denoted by numeral 28A of FIG. 18 in the slider 20A functions as a gap, and is interposed between one end of the return path 27 of the magnetic cores 21A to 21D and the tip portion of the main core 26.

The magnetic cores 21A to 21D are, on the other hand, made of a ferromagnetic material such as Mn-Zn ferrite, and are plate-like members having the same plane shape as the portion which is defined by eliminating the gap from the magnetic core according to the first preferred embodiment, as illustrated in FIG. 4.

Figure 15:
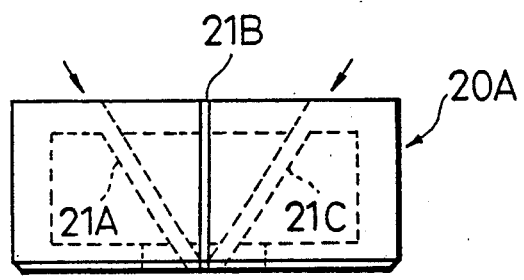
FIG. 15 is a front view of the magnetic head shown in FIG. 14.
Figure 16:
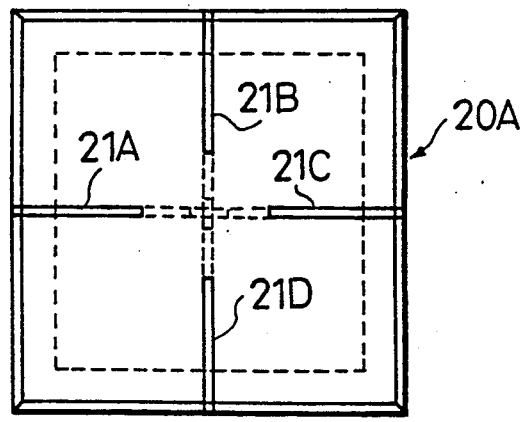
FIG. 16 is a bottom view of the magnetic head shown in FIG. 14.
Figure 17:
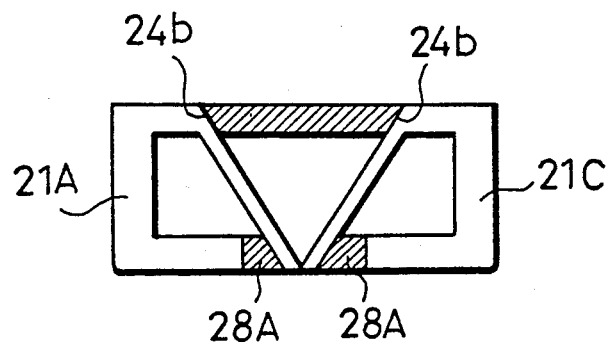
FIG. 17 is a sectional view of the magnetic head along a XV11–XV11 line of FIG. 16.
Figure 18:
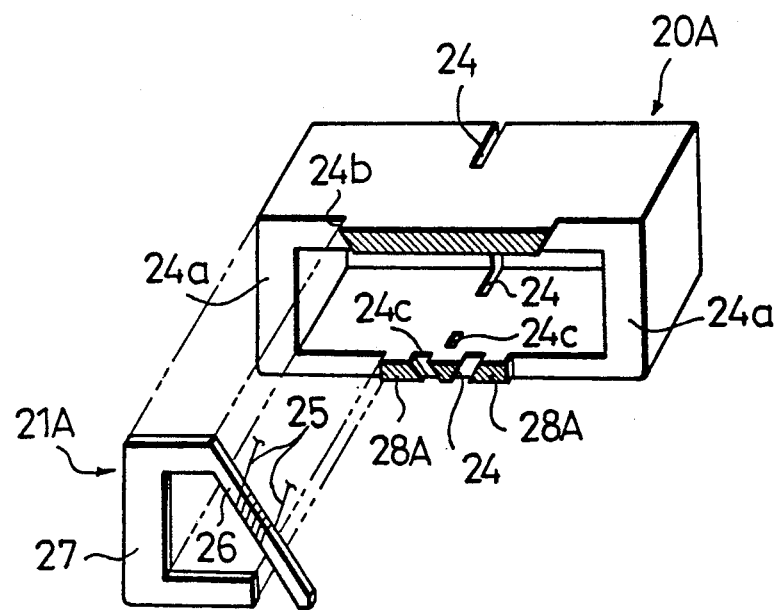
FIG. 18 is a perspective view for representing conditions under which the magnetic head and slider are separated in the same sectional view shown in FIG. 17.
Figure 19:
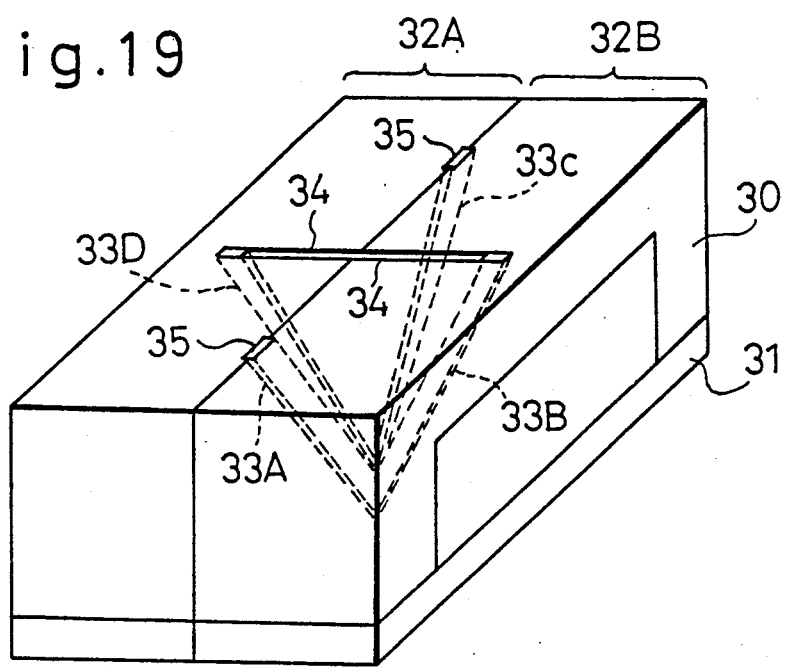
FIG. 19 is a perspective view of an entire magnetic head according to a fourth preferred embodiment.
Figure 20:
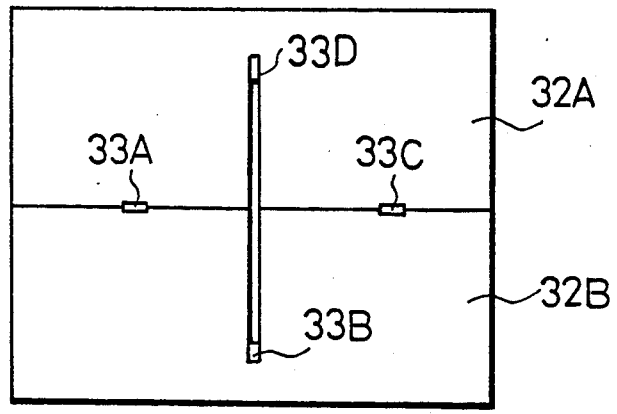
FIG. 20 is a plan view of the magnetic head shown in FIG. 19.
Figure 21:
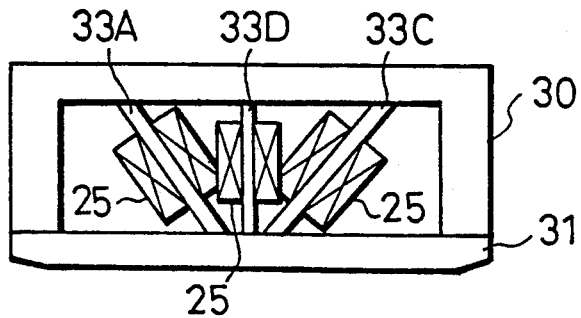
FIG. 21 is a sectional view of the magnetic head illustrated in FIG. 19.
Figure 22:
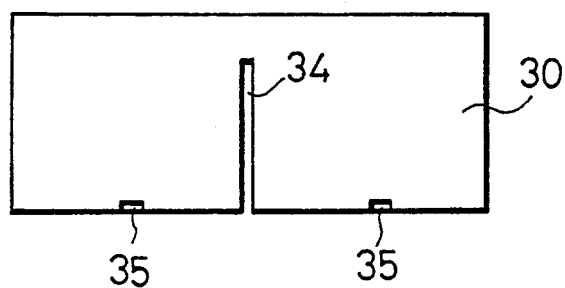
FIG. 22 is a plan view of a slider piece.
Figure 23:
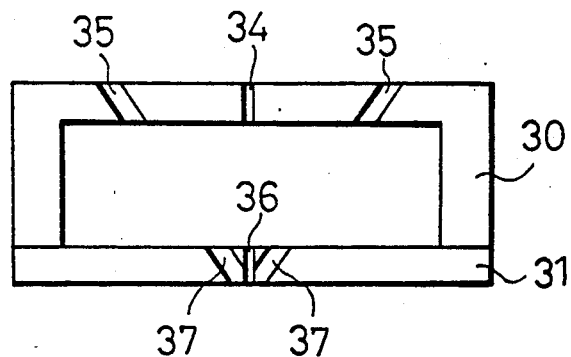
FIG. 23 is a front view of the slider piece shown in FIG. 22.
Figure 24:
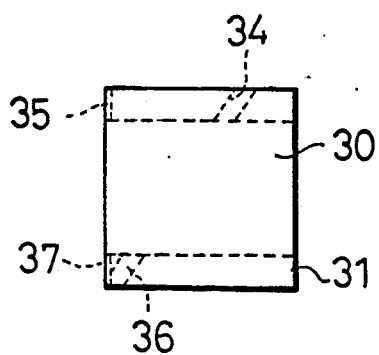
FIG. 24 is a side view of the slider piece shown in FIG. 22.
Figure 25:
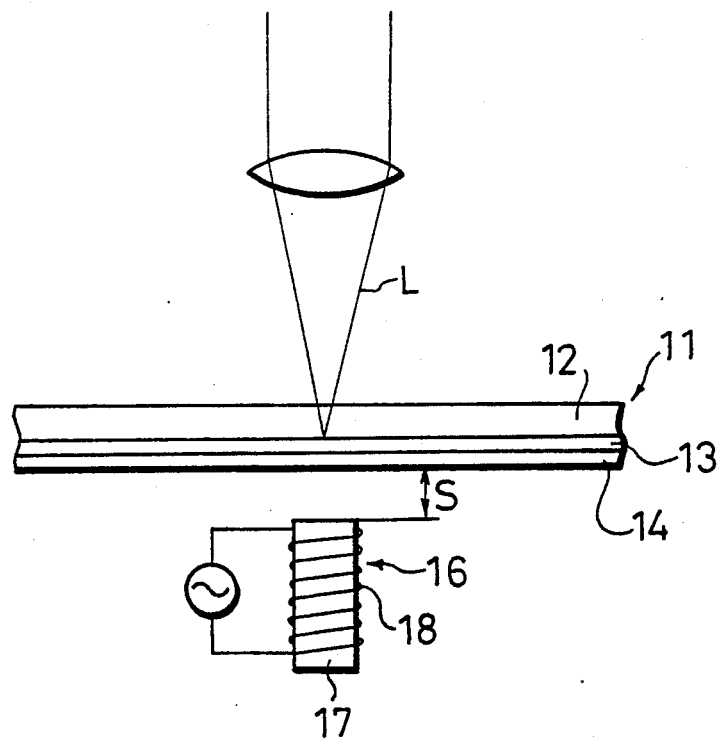
FIG. 25 schematically illustrates a magneto-optical recording apparatus employing a conventional magnetic head.

The magnetic cores 21A to 21D with such constructions are inserted into the slit 24 of the slider 20A in a direction denoted by an arrow in FIG. 15, and furthermore, tip portions of the respective main cores 26 are inserted into holes 24c, so that the magnetic head can be assembled. In the assembled state of the magnetic head, the gap member constituting a part of the slider is present between the tip portions of the main core 26, and return path core 27, which functions as does the magnetic core according to the first preferred embodiment.

Magnetic recording can be performed with such a magnetic head to effect the required magnetic field over a broad range of the magnetic recording medium, which is similar performance to that of the magnetic head according to the first preferred embodiment.

FIGS. 19 to 24 illustrate a magnetic head according to a fourth preferred embodiment of the invention.

A basic structure of this magnetic head is constructed of half-cut slider pieces 32A, 32B which are formed by a half-cut and box-shaped slider body 30 whose lower surface is opened, and a plate-like bottom plate 31 for covering the lower surface of the slider body 30; and also rod-shaped cores 33A to 33D supported by these slider pieces 33A, 33B.

On the portion corresponding to the body 30 of the slider pieces 32A, 32B, as illustrated in the figure, a slit 34 is formed which is cut from the side of the plate-like portion of the upper surface thereof into the, inside thereof, and a groove portion 35 is formed along the side of the plate-like portion. Also, on the bottom plate 31, another slit 36 is cut from the side surface to the inside thereof, which is similar to the above-described body 30. Into the slits 34, 36 on the body 30 and bottom plate 31, both an upper end and lower end of either a core 33B or 33D are inserted, and held at a predetermined angle. The groove portions 35, 37 form slits having the same sizes as the above-described slits 34, 36 by coupling the slider pieces 32A, 32B in one body, into which the upper and lower ends of the core 33A or 33B are inserted.

The above-described body 30 is made of a ferromagnetic material such as Mn-Zn ferrite. Since the bottom plate 31 is made of such a material of CaTiO$_3$, these members function as the return path and gap. In other words, if the sectional plane having the same plane as the cores 33A, 33C, or another sectional plane having the same plane as the cores 33B, 33D is taken into account as to the slider, the return path is formed from these cores 33A to 33D to the inside of the slider body 30, and the magnetic path is formed with the bottom plate 31 functioning as the gap. As a result, the magnetic head according to the fourth preferred embodiment can have the same performance as that of the magnetic head according to the first or third preferred embodiment.

According to the present invention, various modifications may be readily conceived by a skilled engineer.

1) In the above-described preferred embodiments, two pairs of magnetic cores were arranged in such a manner that these cores were symmetrically positioned with respect to the axis line, as a symmetrical center, intersecting normal to the magnetic recording medium. One pair of magnetic cores may be employed, or plural pairs of magnetic cores may be employed.

2) The shapes of the sliders are not limited to those of the above-described preferred embodiments. Various modifications may be employed, taking account of the relationship between the gimbal and magnetic recording medium, the shapes of the magnetic cores, or numbers of the magnetic cores.

3) As to the portion of the magnetic core projecting toward the magnetic recording medium, the tip portion of the magnetic core may employ the curved shape as defined in Japanese patent application No. 62-30274 of the Applicant so as to easily concentrate the magnetic flux in the recording medium.

4) Although according to the preferred embodiment Mn-Zn ferrite was employed as the core material, magnetic metal alloys such as permalloy, Fe-Al-Si alloy (generally referred to as "sendust") and amorphous alloy may be utilized. When such a magnetic metal alloy is employed, it is obvious that better head characteristics can be achieved, as compared with a magnetic head of Mn-Zn ferrite according to the preferred embodiments.

While it has been described in detail, the magnetic head according to the first embodiment has the following particular advantages.

(i) Since the magnetic path, functioning as the return path, which connects both end portions of a plurality of main cores is formed in the magnetic head, the magnetic flux density at the tip portions of the main cores can be increased so that the magnetic field strength required for the magnetic recording medium can be maintained without increasing the magnetomotive force.

(ii) Since the magnetic cores including the above-described main cores are symmetrically positioned with respect to the axis line, as the symmetrical center, parallel to the irradiation direction of the laser light beam, a magnetic field whose strength exceeds a predetermined strength, and which is generated by the respective magnetic cores, can be produced over a broad range of the magnetic recording medium positioned apart from the magnetic cores at a give distance. Accordingly, although the variations in the spacings caused by the surface vibrations of the magnetic recording medium as the disk-shaped rotating member, or the shifts in the relative positions between the optical head and magnetic head may be present, the magnetic recording medium can be surely vertical-magnetized.

(iii) Since the magnetic core is formed in a thin plate, many thin plate-like magnetic cores may be easily mounted on the slider. As a result, the number of these magnetic cores may be properly selected, and also the coils constituting the magnetic cores may be connected in parallel to each other, so that the total inductance of these coils can be suppressed while producing the necessary magnetic field.

Also, the magnetic head according to the second and third embodiments has the following particular merits.

In addition to the above-described advantages as defined by (i) to (iii), the flux density can be increased in the range of the spacings which correspond to the distance from the magnetic head to the surface of the magneto-optical disk to which the magnetic field should be applied, and therefore a stronger magnetic field can be generated.

What is claimed is:

1. A magnetic head for magneto-optical recording wherein light from a laser is applied to a magnetic recording medium thereby heating a portion of said medium and information is recorded on said heated portion by a magnetic head, said magnetic head comprising:

a slider supportable at a predetermined distance from said medium, said slider having a bottom plate opposing said medium and a plurality of core supporting portions, said slider defining a plurality of slits, each slit extending from a center of said bottom plate into one of said core supporting portions;

a plurality of magnetic cores, each said core held in one of said slits, each said core having a main core on which a coil is wound, a return path core connecting both ends of said main core thereby forming a magnetic path, and a gap member extending from one end of said return core to a lower end of said main core;

wherein the lower end of each of said main cores is in contact with the lower end of at least one other main core, thereby concentrating magnetic fields provided by each of said main cores at one location on the heated portion of said magnetic recording medium.

2. The head of claim 1, wherein the lower end portion of each of said main cores is smaller in cross sectional area than a remainder of said core.

3. The head of claim 1, wherein said gap member extends about 1.8 mm.

4. The head of claim 1, wherein each said main core is at an angle of about 35° from an axis perpendicular to a surface of said medium.

* * * * *